United States Patent
Petrachek

(10) Patent No.: US 11,754,743 B2
(45) Date of Patent: Sep. 12, 2023

(54) LASER DETECTION SYSTEM

(71) Applicant: Atlas-Apex Roofing Inc., Etobicoke (CA)

(72) Inventor: John Petrachek, Etobicoke (CA)

(73) Assignee: ATLAS-APEX ROOFING INC, Ontario (CA)

( * ) Notice: Subject to any disclaimer, the term of this patent is extended or adjusted under 35 U.S.C. 154(b) by 0 days.

(21) Appl. No.: 17/210,145

(22) Filed: Mar. 23, 2021

(65) Prior Publication Data

US 2021/0302616 A1  Sep. 30, 2021

Related U.S. Application Data

(60) Provisional application No. 62/993,271, filed on Mar. 23, 2020.

(51) Int. Cl.
| | |
|---|---|
| *G01V 8/12* | (2006.01) |
| *G01W 1/14* | (2006.01) |
| *G08C 17/02* | (2006.01) |

(52) U.S. Cl.
CPC .................. *G01V 8/12* (2013.01); *G01W 1/14* (2013.01); *G08C 17/02* (2013.01)

(58) Field of Classification Search
CPC ............ G01V 8/12; G01W 1/14; G08C 17/02
See application file for complete search history.

(56) References Cited

U.S. PATENT DOCUMENTS

| | | | | |
|---|---|---|---|---|
| 5,554,972 A | * | 9/1996 | Byrne .................. | G08B 13/183 340/552 |
| 5,890,322 A | * | 4/1999 | Fears ...................... | F24F 7/025 52/302.1 |
| 10,148,760 B2 | * | 12/2018 | Barragan ................ | B61L 29/30 |

FOREIGN PATENT DOCUMENTS

JP          2017191044 A    *  10/2017

* cited by examiner

*Primary Examiner* — Kevin K Pyo
(74) *Attorney, Agent, or Firm* — Valauskas Corder LLC

(57) ABSTRACT

A monitoring system comprising a transmitter and a receiver, the transmitter including a laser transmitter assembly selectively securable to a transmitter post between a transmitter proximate position adjacent a base end of the post and a transmitter distal position adjacent a distal end of the post, the laser transmitter assembly including a laser source arranged to project a laser beam from the transmitter, the receiver to be located a transmission distance from the transmitter and including a laser receiver assembly selectively securable to a receiver post between a receiver proximate position adjacent a base end of the post and a receiver distal position adjacent a distal end of the post to be aligned with the laser transmitter assembly to receive the laser beam, the laser receiver assembly including a detector to detect the laser beam and generate a signal in response to a laser beam interruption event.

20 Claims, 13 Drawing Sheets

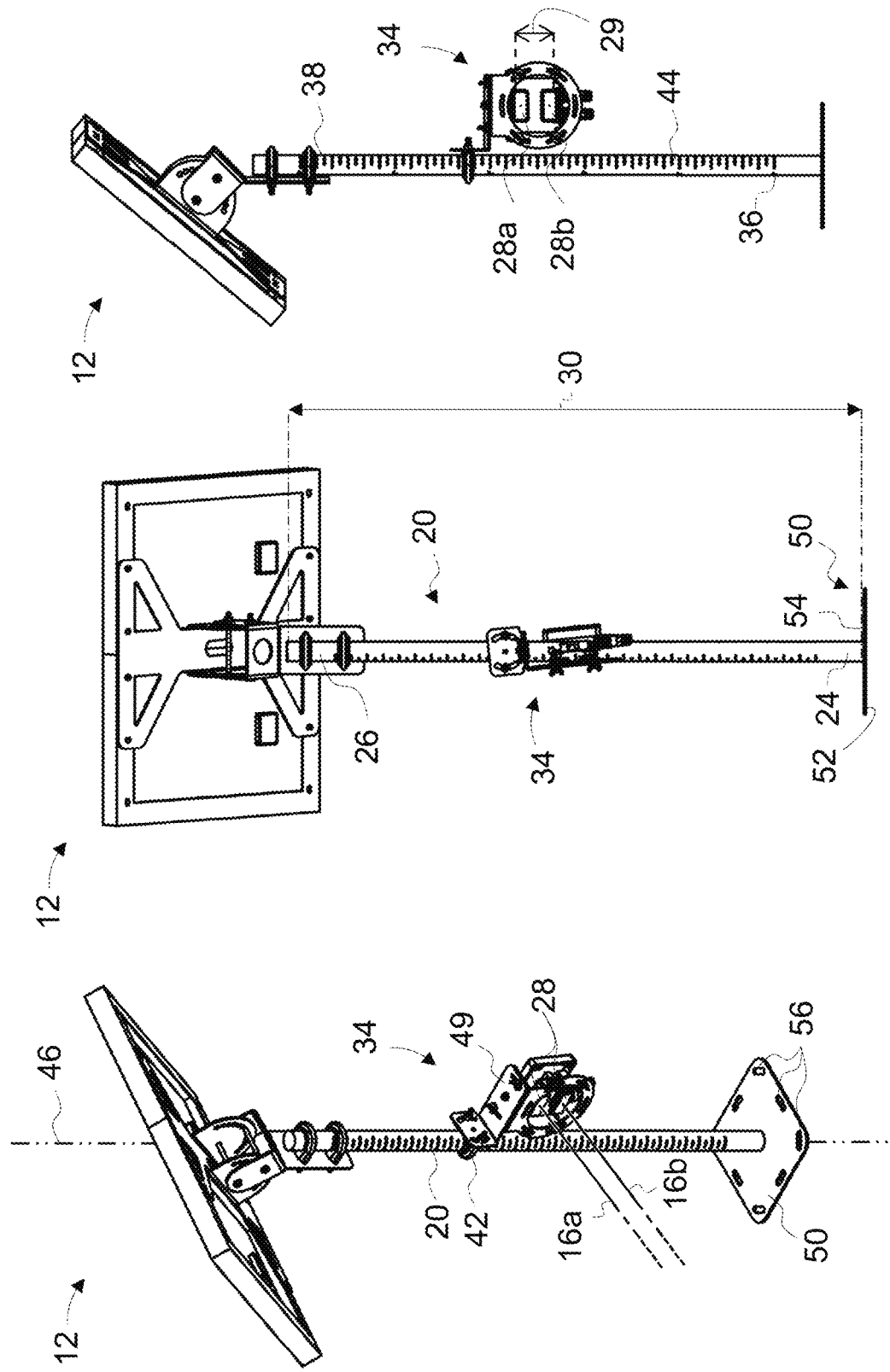

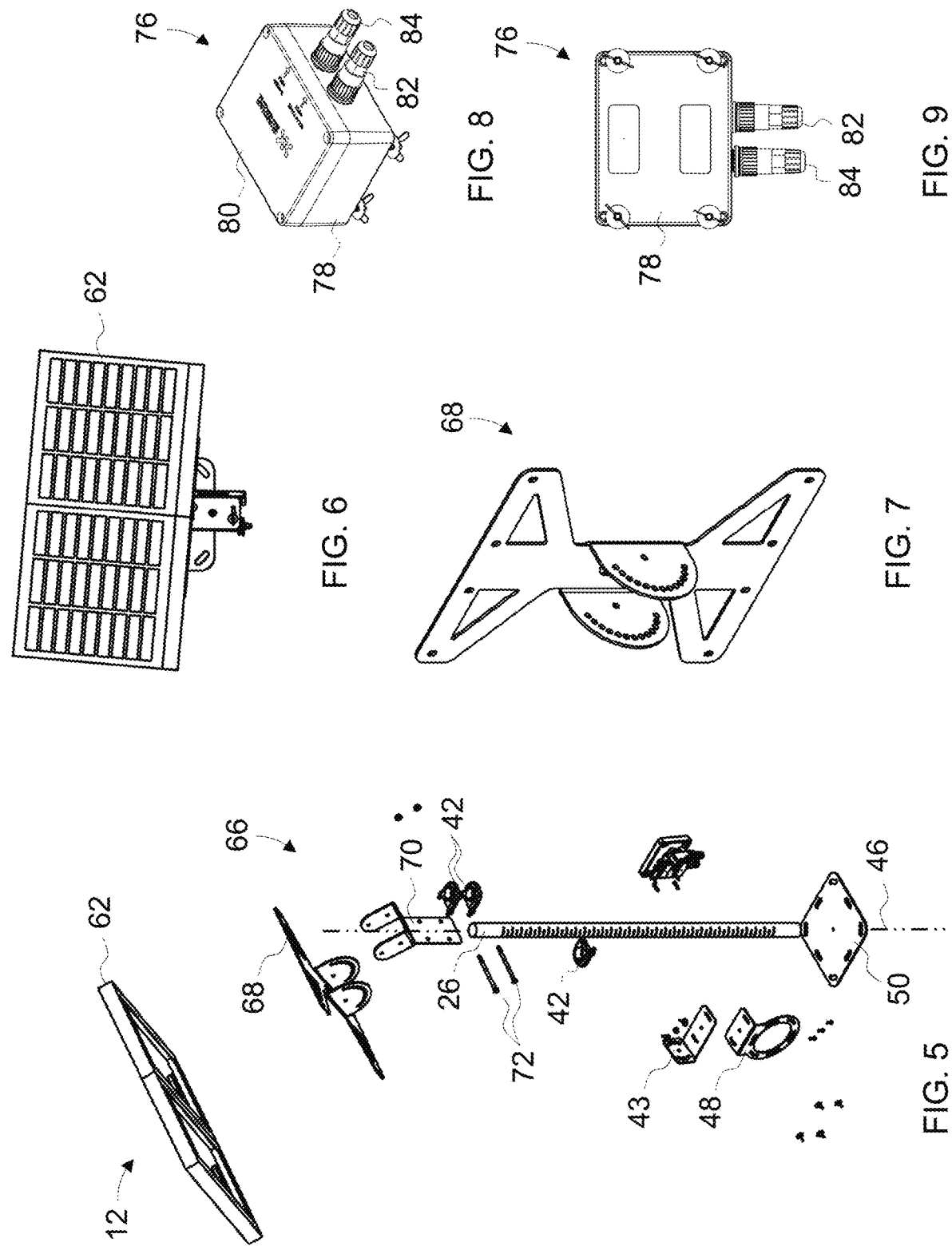

LASER DETECTION SYSTEM

CROSS-REFERENCE TO RELATED PATENT APPLICATION

The application claims the benefit of U.S. Provisional Application No. 62/993,271, filed on Mar. 23, 2020. The complete disclosure of U.S. Provisional Application No. 62/993,271 is incorporated herein by reference.

TECHNICAL FIELD

The described embodiments relate to detection systems, particularly detection systems comprising a laser.

BACKGROUND

U.S. Pat. No. 6,127,926 purports to disclose a vertical surface protection in a security installation achieved by detecting disturbances in a microwave beam sent from a transmitter to a receiver, both installed substantially above the ground and adjacent to the vertical surface. The sensor may be used with an intruder detector to protect buildings in scaffold by utilizing triple technology exterior detection incorporating: microwave Doppler shift; at least one and preferably two passive infra-red devices linked together through timers and lens with horizontal curtain pattern; and anti-sabotage reflected active infra-red.

U.S. Pat. No. 7,646,309 purports to disclose a method for monitoring the load which is exerted on a roof. The method including the following steps: providing a roof with an external surface on which a load can be exerted by, for example, a layer of water or snow, providing a sensor for detecting a phenomenon related to the load which is exerted on the roof, monitoring the phenomenon with the sensor, storing at least one predetermined value for the phenomenon, emitting a signal when the value for the phenomenon detected by the sensor exceeds a predetermined value.

Japanese Patent Application No. 2013 186076 purports to disclose a laser snow depth meter comprising a laser measurement device that irradiates a snow surface with a laser beam, and measures a snow depth on the basis of the laser beam reflected on the snow surface; and a human body detector that detects a radiation amount of an infrared emitted from a predetermined monitoring area including a radiation range of the laser beam with an infrared sensor, and detects the presence of intruding objects such as a human in the monitoring area on the basis of the detection result of the infrared sensor.

Japanese Patent No. 6,440,324 purports to disclose a snow accumulation detection device directed to a snow surface to form spots on the snow surface; two light irradiation units for irradiating the snow surface with the two spots; a snow accumulation height calculation part for calculating a snow accumulation height from a distance between the two spots photographed by the imaging camera; and a control part for measuring weather data for collecting the relation between the weather data and the snow removal work data. A recorded meteorological snow removal database; and a snow removal work determination part for comparing the measured weather data with the snow removal work data of the weather snow removal database to determine the necessity of the snow removal operation.

United States Patent Application No. 2019 0127985 purports to disclose an Internet-based system for helping building management team members in significant ways: (i) predicting and forecasting when excessive snow load conditions present serious risks to a building's structure; (ii) receiving automatic notifications when snow load conditions are developing at specific regions on a building rooftop to warrant intervention and automated mitigation through the use of VR-guided snow removing robot systems; (iii) collecting various forms of intelligence about conditions developing on and about a building rooftop and storing such information with annotations for use in supporting intelligent decision making processes; (iv) quickly, efficiently and safely removing dangerous risk—presenting snow load conditions on a building rooftop while minimizing risk to human workers and increasing building operating efficiency; and (v) automatically removing excessive snow load conditions at specified regions on a building's rooftop.

SUMMARY

In a first aspect, there is provided a monitoring system for monitoring an environment, comprising a transmitter, including a transmitter post having a base end for attaching to a first surface of the environment and a distal end spaced from the base end by a transmitter post length, a laser transmitter assembly selectively securable to the transmitter post between a transmitter proximate position adjacent the base end and a transmitter distal position adjacent the distal end, the laser transmitter assembly including a laser source arranged to project a laser beam from the transmitter; and a receiver to be located a transmission distance from the transmitter, the receiver including a receiver post having a base end for attaching to a second surface of the environment and a distal end spaced from the base end by a receiver post length, a laser receiver assembly selectively securable to the receiver post between a receiver proximate position adjacent the base end and a receiver distal position adjacent the distal end to be aligned with the laser transmitter assembly to receive the laser beam, the laser receiver assembly including a detector to detect the laser beam and generate a signal in response to a laser beam interruption event.

In some embodiments, the transmitter post and the receiver post are each elongated posts of constant cross section, the transmitter further including a transmitter stabilizing footing shaped to hold the base end of the transmitter post and to be secured to the first surface to attach the base end of the transmitter post to the first surface, the receiver further including a receiver stabilizing footing shaped to hold the base end of the receiver post and to be secured to the second surface to attach the base end of the receiver post to the second surface.

In some embodiments, each of the transmitter and receiver stabilizing footings includes a planar plate having an environmental surface face and an opposite post face with a plurality of apertures therethrough from the environmental surface face to the post face, each aperture shaped to receive a fastener.

In some embodiments, the laser beam interruption event is an interruption lasting at least five seconds.

In some embodiments, the laser transmitter assembly further includes a beam transmitter positioned to receive the laser beam from the laser source and transmit the laser beam from the transmitter.

In some embodiments, the beam transmitter is a plurality of beam transmitters and the laser beam is split into a plurality of laser subbeams each produced by one of the plurality of beam transmitters.

In some embodiments, the plurality of laser subbeams are generally parallel and spaced by at least a threshold spacing, and the laser beam interruption event is a coincident interruption of each of the plurality of laser subbeams.

In some embodiments, the laser beam interruption event is an interruption lasting at least one second.

In some embodiments, the threshold spacing is at least 1 mm.

In some embodiments, the transmitter includes a solar panel coupled to the laser transmitter to power the laser source.

In some embodiments, the receiver includes a solar panel coupled to the detector to power the detector.

In some embodiments, the laser transmitter assembly includes a laser transmitter mount to hold the laser source and to be selectively secured to the transmitter post.

In some embodiments, the laser transmitter mount includes a collar member to be selectively secured around the transmitter post to hold the transmitter assembly to the transmitter post.

In some embodiments, the laser receiver assembly includes a detector mount to hold the detector and to be selectively secured to the receiver post.

In some embodiments, the detector mount includes a collar member to be selectively secured around the receiver post to hold the receiver assembly to the receiver post.

In some embodiments, comprising a communication system coupled to the detector to receive the signal and transmit the signal to a user communication device.

In some embodiments, the communications system includes a communications box and a communications box cover for providing a weather tight compartment for housing a set of electronics of the communications system.

In some embodiments, the set of electronics includes a transceiver.

In some embodiments, the communication system includes a system gateway and a system server, the system gateway configured to receive the signal and transmit the signal to the system server.

In some embodiments, the system server is configured to receive the signal and send data, alerts, and warnings to the user communication device.

BRIEF DESCRIPTION OF THE DRAWINGS

The drawings included herewith are for illustrating various examples of systems, methods, and apparatus of the present specification. In the drawings:

FIG. 2 is a perspective view of a transmitter of the detection system of FIG. 1;

FIG. 3 is a right side elevation view of the transmitter of FIG. 2;

FIG. 4 is a front elevation view of the transmitter of FIG. 2;

FIG. 5 is a perspective exploded view of the transmitter of FIG. 2;

FIG. 6 is a perspective view of a solar assembly of the transmitter of FIG. 2;

FIG. 7 is a perspective view of a bracket of the transmitter of FIG. 2;

FIG. 8 is a perspective view of a communications system of the transmitter of FIG. 2;

FIG. 9 is a bottom plan view of the communications system of FIG. 8;

DETAILED DESCRIPTION

Various systems, methods and apparatus will be described below to provide an example of each claimed embodiment. No embodiment described below limits any claimed embodiment and any claimed embodiment may cover systems, methods and/or apparatus that differ from those described below. The claimed embodiments are not limited to systems, methods and apparatus having all of the features of any one system, method and apparatus described below or to features common to multiple or all.

Figure 1:
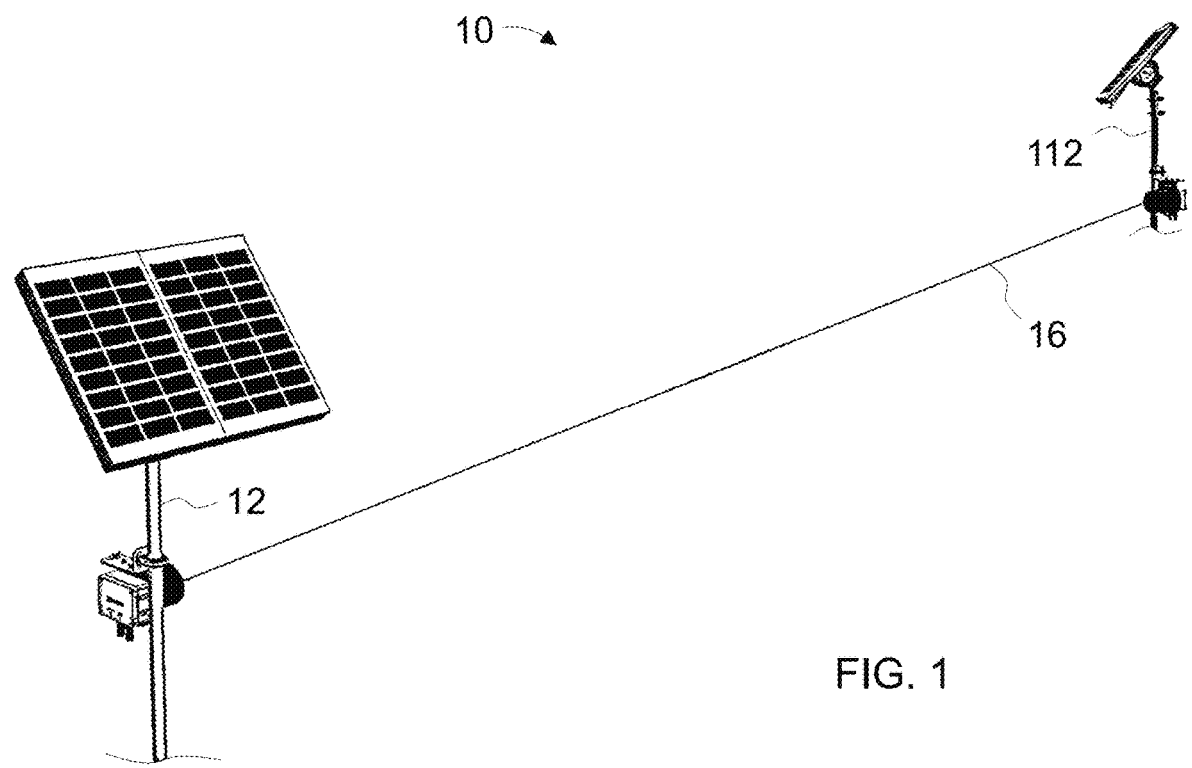
FIG. 1 is a perspective view of a detection system, according to an embodiment.
Figure 12:
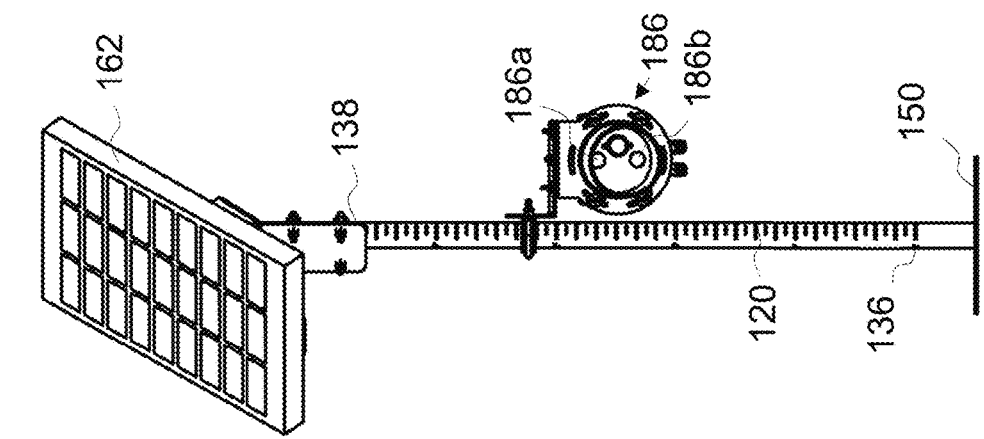
FIG. 12 is a front elevation view of the receiver of FIG. 10.
Figure 11:
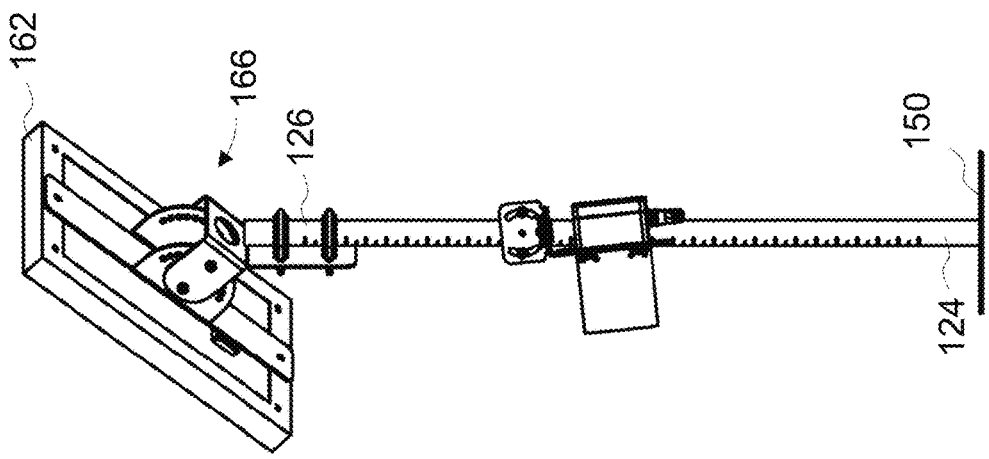
FIG. 11 is a right side elevation view of the receiver of FIG. 10.
Figure 10:
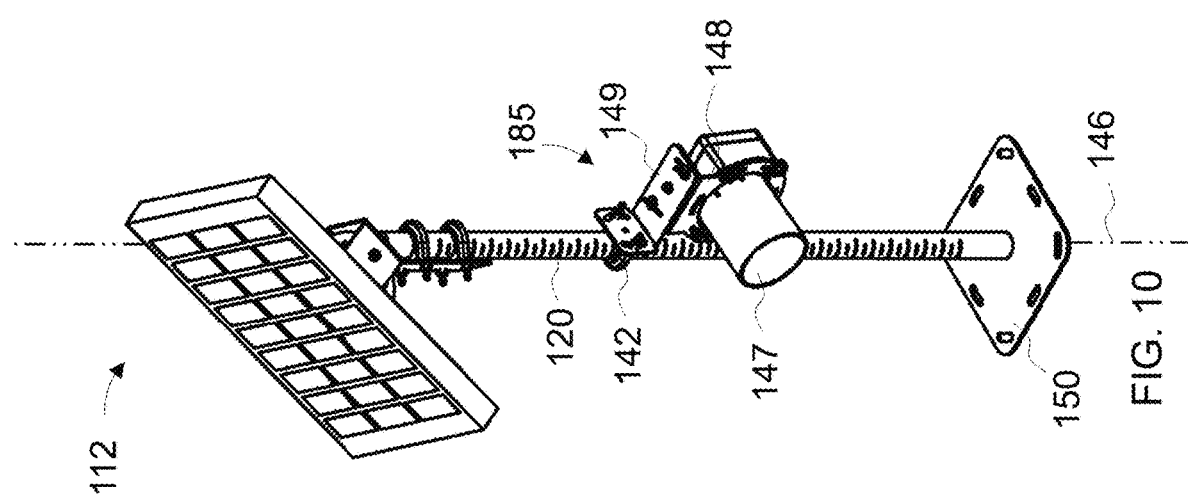
FIG. 10 is a perspective view of a receiver of the detection system of FIG. 1.
Figure 14:
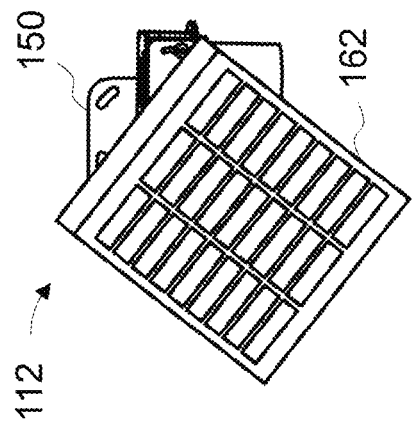
FIG. 14 is a top view of the receiver of FIG. 10.
Figure 13:
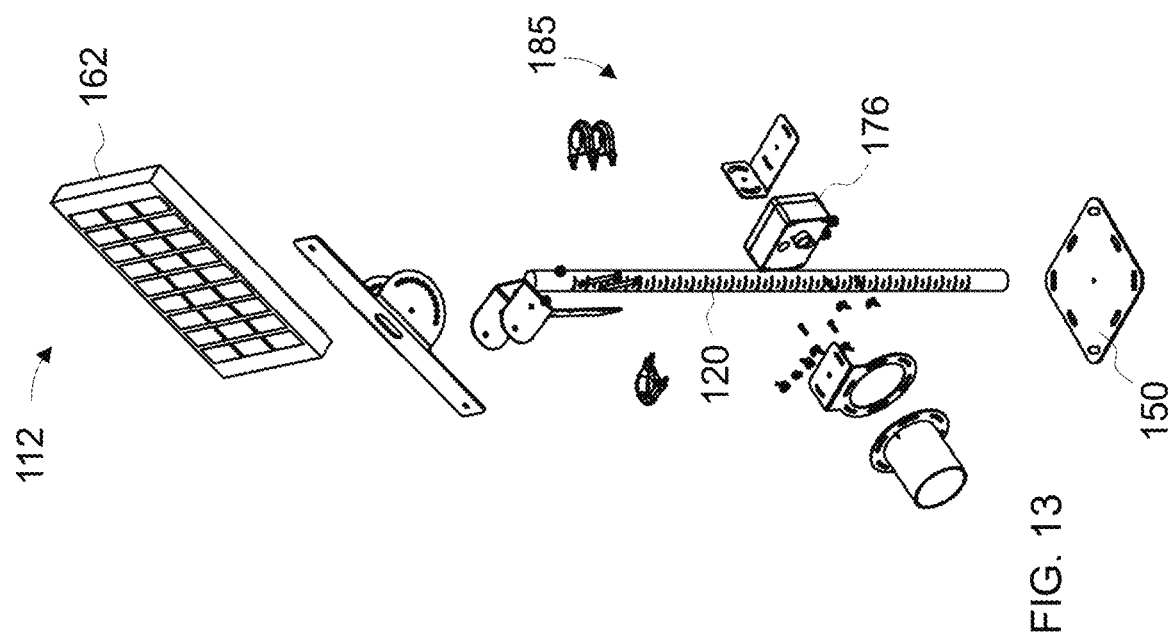
FIG. 13 is a perspective exploded view of the receiver of FIG. 10.

Referring to FIG. 1, an example monitoring system 10 is depicted. The illustrated monitoring system 10 includes a transmitter 12 and a receiver 112. Transmitter 12 transmits a laser beam 16 and receiver 112 is aligned with transmitter 12 to receive the laser beam 16. Laser beam 16 may be a continuous beam or a pulsed beam and may be a plurality of generally parallel beams.

System 10 may be mounted in an environment that a user of system 10 wishes to monitor. In some embodiments, system 10 may be used to monitor the accumulated height of a material. For example, system 10 may be mounted on a roof, such as a flat commercial roof, to monitor the accumulation of snow on the roof. When a sufficient height and density of snow has accumulated, receiver 112 detects a break in beam 16 and can provide a signal to indicate the break. As the weight of snow or ice may damage a roof, system 10 may be used to monitor snow levels to provide an approximation of the weight of snow on a roof or a warning signal if an a height of snow accumulation indicates a possible need for snow or ice removal.

In some embodiments, system 10 may be used to monitor activity. For example, a break in beam 16 detected by receiver 112 may trigger the activation of cameras. If system 10 is set up adjacent a roof edge with beam 16 parallel to a roof edge, one or more cameras may be used to provide images as objective evidence in the event of an incident such as an intrusion onto a roof or a fall from the roof.

While illustrated monitoring system 10 includes a single transmitter 12 and a single receiver 112, in other embodiments a monitoring system 10 may include more than one transmitter 12 and/or more than one receiver 112. For example, a transmitter 12 may transmit a first laser beam in a first direction and a second laser beam in a second direction different from the first direction, with a first receiver positioned to receive the first laser beam and a second receiver positioned to receive the second laser beam. In another example, a receiver may be positioned to receive a first laser beam from a first transmitter and a second laser beam from a second transmitter. Arrangements of transmitters and receivers may enable monitoring of large and/or irregularly shaped spaces.

Referring to FIGS. 2 to 4, transmitter 12 includes a transmitter post 20. Transmitter post 20 has a base end 24 for attaching to a first surface of the environment being monitored. Transmitter post 20 also has a distal end 26 spaced from the base end by a transmitter post length 30.

Transmitter 12 also has a laser transmitter assembly 34. Laser transmitter assembly 34 is selectively securable to the transmitter post 20 between a transmitter proximate position 36 (FIG. 4) adjacent the base end 24 and a transmitter distal position 38 adjacent the distal end 26. Laser transmitter assembly 34 includes a laser source (not shown), such as a laser diode, arranged to project the laser beam 16 from the transmitter 12. As laser transmitter assembly 34 is adjusted along transmitter post 20, laser beam 16 is correspondingly directed out at different heights.

In the illustrated embodiment, laser beam 16 is directed from the laser source to an array of beam transmitters 28. Beam transmitters 28 includes a top transmitter 28a and a bottom transmitter 28b, each transmitting a subbeam 16a, 16b of laser beam 16. Subbeams 16a and 16b are generally parallel to one another. Transmitters 28a and 28b are spaced apart by a transmission spacing 29. In some embodiments, transmission spacing 29 may be approximately 1 mm while in some embodiments transmission spacing 29 may be approximately 10 mm or more.

In some embodiments, there may be more than one laser source and/or one, at least three, or no beam transmitters. For example, in some embodiments a single laser source may supply a single beam transmitter 28 to transmit a single laser beam 16. In some embodiments, a user may be able to choose how many laser sources and/or transmitters to use, such as for application-specific uses. In embodiments including three or more transmitters 28, transmission spacing 29 may be smaller than embodiments including only two transmitters 28. In some embodiments, transmitters 28 may be arranged in a line, grid, or staggered grid.

In the illustrated example, laser transmitter assembly 34 includes a laser transmitter mount 49. Laser transmitter mount 49 is provided to hold the laser source, and can be selectively secured to transmitter post 20 by way of collar 42. Collar 42 is secured to laser transmitter mount 49 and receives transmitter post 20 therethrough. When collar 42 is loosened, transmitter assembly 34 may be adjusted along the length of transmitter post 20. When transmitter assembly 34 is positioned in a desired position, collar 42 may be tightened around post 20 to hold the laser transmitter assembly 34 in position. Collar 42 may have an inner surface formed of a high-friction material to assist in keeping laser transmitter assembly 34 from slipping along pole 20 when collar 42 is tightened.

As illustrated, transmitter post 20 may have a ruler decal 44 printed, formed, or otherwise displayed thereon to assist a user in choosing a position for laser transmitter assembly 34. In some embodiments, a position of laser transmitter assembly 34 may be controlled remotely, and in such embodiments transmitter 12 may incorporate a sensor or counter to inform the user of the present position of the laser transmitter assembly 34.

In some embodiments, laser transmitter assembly 34 may be secured to transmitter post 20 in other ways, such as by magnetic or mechanical fasteners. For example, post 20 may include apertures provided to receive a retaining pin or plate to hold assembly 34. In some embodiments, a housing of a laser source may be directly selectively securable to a post 20.

As illustrated, laser transmitter assembly 34 also includes a mounting plate 48 to allow a light shade (not shown) to be mounted to the laser transmitter assembly to shelter the beam transmitters 28. In some embodiments, a light shade and corresponding mounting plate 48 may be omitted.

In the illustrated example, transmitter post 20 is an elongated post of constant cross section defining a longitudinal axis 46, although in other embodiments post 20 may take on other shapes while allowing laser transmitter assembly 34 to be selectively positioned thereon. In the illustrated example, transmitter 12 also includes a stabilizing footing 50 to provide a stable interface between base end 24 and an environmental surface.

In some embodiments, base end 24 may be secured directly to an environmental surface. However, in the illustrated embodiment stabilizing footing 50 is provided for increasing the stability of transmitter 12 when base end 24 of post 20 is secured to an environmental surface. In the illustrated example, stabilizing footing 50 is a substantially planar plate having an environmental surface face 52 and an opposite post face 54. Base end 24 may be secured to post face 54, such as by welding or being secured by mechanical fastener to a fitting formed on post face 54.

Footing 50 may then be secured to the environmental surface by way of fasteners, such as threaded fasteners, passed through apertures 56 and anchored to the environmental surface. As the footprint of footing 50 is larger than the footprint of base end 24, footing 50 increases the stability of transmitter 24. In other embodiments, footing 50 may be secured to an environmental surface in other ways, such as by welding, adhesive, magnetic fasteners, or clips. In some embodiments, transmitter 12 may rest on an environmental surface without being secured thereto.

While the illustrated footing 50 is shaped generally as a plate, in other embodiments footing 50 may be otherwise shaped. For example, stabilizing footing 50 may be a frustum-shaped base having a planar environmental surface face 52 with a fitting for base end 24 formed in the opposite post face 54 at the narrow side of the frustum. In some embodiments, an environmental surface face is non-planar, such as to accommodate uneven, sloped, or curved environmental surfaces.

In some embodiments, footing 50 may be shaped to be secured to a horizontal, vertical or sloped surface, such as by having an environmental surface face 52 in a plane that is at an angle to a longitudinal axis 46 of transmitter 12. In some embodiments, footing 50 is shaped to be secured to a textured mounting surface, such as by having legs or other structure formed on an environmental surface face 52.

Transmitter 12 includes a power source for powering the laser source and/or additional electronics. A power source may be, for example, a battery provided to hold a charge for use in powering a laser diode. Referring to FIGS. 5 to 7, in the illustrated example, transmitter 12 includes a solar panel 62 mounted to distal end 26 of transmitter pole 20. Solar panel 62 is conductively coupled to a battery (not shown) to charge the battery. The battery is conductively coupled to the laser source to power the laser source.

Solar panel 62 is mounted to distal end 26 by way of an adjustable angle bracket assembly 66. Bracket assembly 66 includes a first bracket member 68 secured to solar panel 62 and a second bracket member 70 secured to distal end 26. First bracket member 68 is pivotally secured to second bracket member 70, held in relative position by pins 72. Bracket assembly 66 is secured to transmitter post 20 by way of two collar members 42 to allow some adjustment, for example collar members 42 allow bracket assembly 66 to be rotated about axis 46.

In some embodiments, the solar panel may be omitted and the battery may be used alone. In some embodiments, the battery and solar panel may be omitted, such as if the transmitter is powered by a wired connection to an external power supply such as a power network of a building on which the transmitter is mounted.

Referring to FIGS. 8 and 9, transmitter 12 also includes a communications system 76. In the illustrated example, communications system 76 is contained in a communications box 78 covered by a communications box cover 80 to provide a weather tight compartment for housing a set of electronics of the communications system 76. In some embodiments, a gasket may be received between the communications box 78 and the communications box cover 80 to provide an improved seal. Communications box 78 may be mounted to or incorporated into laser transmitter assembly 34 in some embodiments so as to move with transmitter assembly 34.

The set of electronics may include a transceiver for sending data and/or receiving instructions. For example, communications system 76 may send information about the performance of the laser source or one of the beam transmitters 28. The signal may be sent to a user device, such as a smartphone of a building manager if the monitoring system is mounted on a roof of a managed building to monitor snow accumulation.

Communications system 76 may also receive instructions from a user in some embodiments, such as instructions for the laser beam to be turned on or off, or for an adjustment in the position of one or more of the solar panel or laser transmitter assembly. In embodiments in which one or more of the solar panel or laser transmitter assembly may be adjusted remotely, system 10 may include one or more motors or other actuators communicatively coupled to communications system 76 to receive signals, the motors or actuators configured to effect adjustments in position in response to signals.

Communications box 78 includes a solar lead 82 and a battery lead 84. Solar lead 82 is provided to be secured to solar panel 62 to receive power from solar panel 62, while battery lead 84 is provided to be secured to a battery to receive power therefrom. While in the illustrated embodiment communications system 76 is configured to receive power from either or both of a batter and a solar panel, in some embodiments it may only be powered by one of a battery and a solar panel, or by an alternate power source. The power source of the communications system 76 may be the same power source used to power a laser source and/or motors or the system 10, or may be independent.

Communications box 78 may also include one or more access points or leads (not shown) for wired connection to a laser source and/or a motor to receive or send data.

As indicated above, in some embodiments, a user may be able to switch the laser source on and off manually and/or remotely. For example, the user may be able to send a wireless signal to the communications system 76 of the transmitter 12 to direct the laser source to turn off while the communications system 76 remains on to receive a further signal from a user to turn the laser source back on. In some embodiments, the transmitter 12 may be configured to turn on the laser source automatically, such as upon detecting by way of a sensor or being informed by way of the communications system of a condition such as a low-light condition, low-temperature condition, or snowfall event. For example, a communications system may receive weather data from a third party and turn on when the weather data indicates an expected snowfall event within the next few hours and may turn off when the weather data indicates that no snowfall is expected for the next few hours.

Referring to FIGS. 10 to 14, depicted is a receiver 112. Receiver 112 is similar in many respects to transmitter 12, and like features are identified by like reference characters, incremented by 100.

Receiver 112 includes a receiver pole 120 affixed to a footing 150 at a base end 124 thereof. A solar panel 168 is adjustably secured to a distal end 126 of pole 120 by way of a pivoting bracket assembly 166.

Receiver 112 also includes a laser receiver assembly 185 selectively securable to the receiver post 120 between a receiver proximate position 136 adjacent the base end 124 and a receiver distal position 138 adjacent the distal end 126. The receiver 112 may be positioned to align with laser beam 16 from transmitter 12, and laser receiver assembly 185 may be adjusted to receive laser beam 16.

Laser receiver assembly 185 includes a detector. In the illustrated example detector 186 is an array of detectors, the array of detectors including two detectors 186a and 186b. Each of detectors 186a and 186b is positionable to align with one of top transmitter 28a and bottom transmitter 28b to receive a subbeam 16a, 16b therefrom.

As illustrated, laser receiver assembly 185 includes a detector mount 149. Detector mount 149 is provided to hold the detector 186, and can be selectively secured to transmitter post 120 by way of collar 142. Collar 142 is secured to detector mount 149 and receives transmitter post 120 therethrough. When collar 142 is loosened, receiver assembly 185 may be adjusted along the length of transmitter post 120. When receiver assembly 185 is positioned in a desired position, collar 142 may be tightened around post 120 to hold the laser receiver assembly 185 in position. Collar 142 may have an inner surface formed of a high-friction material to assist in keeping laser receiver assembly 185 in position.

As illustrated, laser receiver assembly 185 also includes a mounting plate 148 to allow a light shade 147 to be mounted to the laser receiver assembly 185 to shelter the detector array 186.

Detector 186 detects laser beam 16 and generates a signal in response to a laser beam interruption event. A laser beam interruption event may be an interruption of one or more laser beam 16. The interruption may be required to last a threshold amount of time such as one second or five seconds before being interpreted as a laser bam interruption event. The intended use of the monitoring system may influence the threshold amount of time. For example, a snowfall monitoring system with a threshold of one second might produce many false positives due to animal movement or snowflakes, while a roof-edge monitoring system with a threshold of five seconds may miss a relevant interruption and fail to trigger a camera to capture an intrusion or a fall.

A laser beam interruption event may be a coincident interruption of each laser beam 16 in embodiments arranged to use a plurality of generally parallel laser beams 16 from separate laser sources and/or each subbeam in embodiments arranged to use a plurality of generally parallel laser subbeams from separate beam transmitters. In some embodiments, a laser beam interruption event is a combination of coincident interruption and of threshold duration, for example system 10 may generate the signal in response to a coincident interruption of each of the two generally parallel subbeams 16a, 16b coming from transmitters 28a and 28b if the coincident interruption lasts for at least one second. In some embodiments, a user may be able to choose the definition of a laser beam interruption event, such as setting a longer threshold duration to account for frequent animal activity in the environment.

A user may also adjust laser sources and/or beam transmitters to adjust separations of beams and/or subbeams to account for expected false alarms such as caused by animal activity. For example, a larger spacing between beams may make a coincident interruption less likely in the event of a wing flap of a bird. However, spacing between beam transmitters and/or laser sources may be restricted by practical limits, for example in some embodiments a spacing more than 5 mm may result in an impractically large laser transmitter assembly and/or laser receiver assembly.

Receiver 112 also includes a communication system 176. In some embodiments, the communication system is secured to, or forms a part of, laser receiver assembly. Detector 186 provides the signal to the communication system to be sent to a user. For example, the communication system may send an alert to a user communications device such as a smartphone or desktop computer. In some embodiments, the communication system sends a message to a system gateway (not shown). The system gateway then transmits a communication to a system server (not shown) which may generate an alert to be sent to a user.

In some embodiments a communications system 176 only receives a signal from one or more of a laser source, beam transmitter 28, power source, or detector 186 upon the occasion of a status change. For example, a communications system may only receive a signal from a laser source if the laser source malfunctions or may only receive a signal from detector 186 if a laser interruption event is detected or if a break in laser signal is detected. Receiving a signal upon the occasion of a signal change may allow communications system 176 to be smaller and/or more energy efficient.

In other embodiments, a communications system 176 may receive a continuous signal from one or more of a laser source, beam transmitter 28, power source, or detector 186, and may send a signal on to server continuously or on the occasion of a status change. Receiving a continuous signal may be required in some embodiments, such as if the laser source and/or detector does not have the processing capability to determine when to send a signal.

Figure 15:
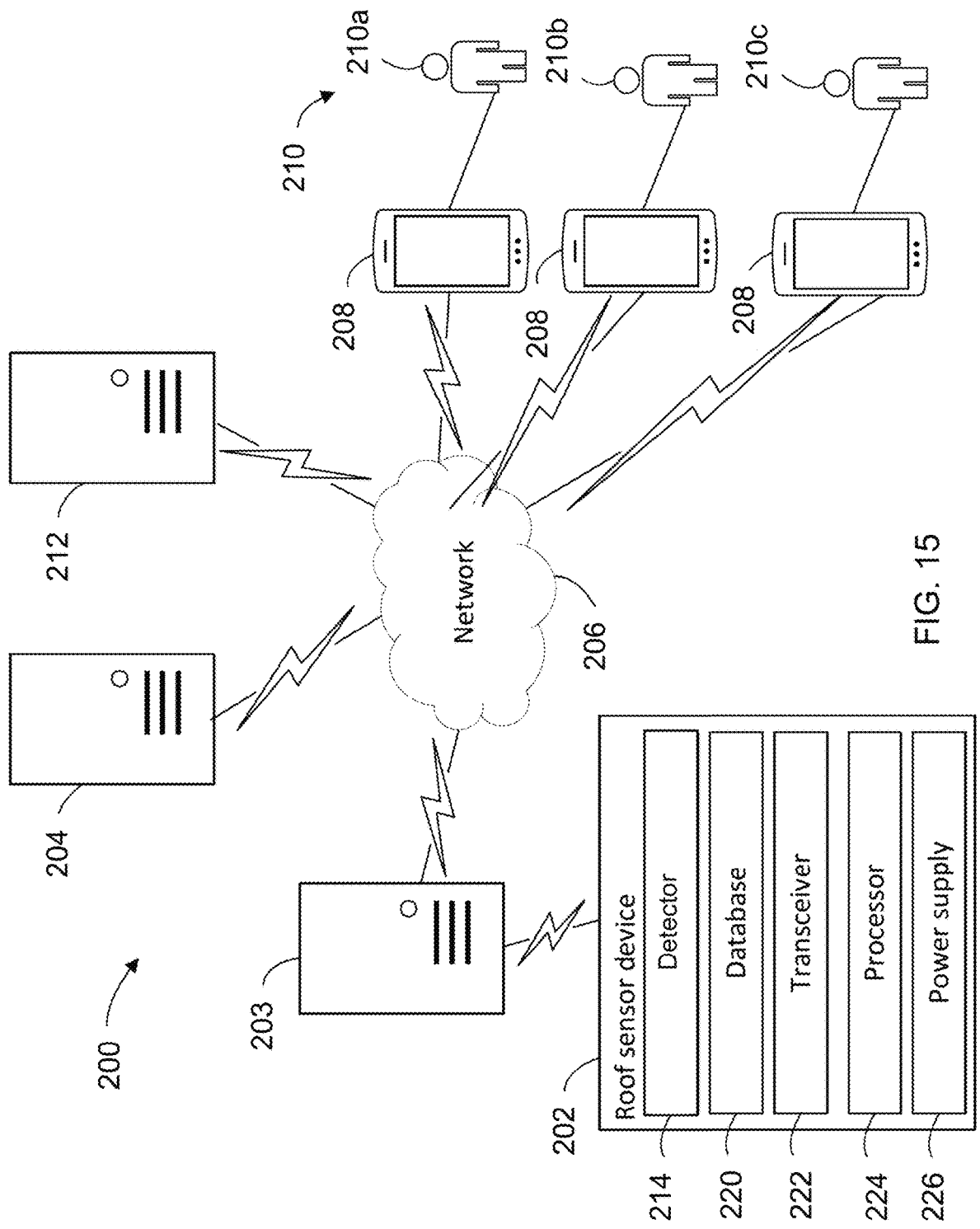
FIG. 15 is a block diagram of a monitoring system, according to an embodiment.

Referring to FIG. 15, illustrated therein is a monitoring system 200, in accordance with an embodiment. The monitoring system 200 includes a sensor device 202, such as the system 10 as described above. The sensor device 202 includes at least one detector 214 such as the detector 185 described above.

The sensor device 202 measures a laser beam and transmits a signal indicating a laser beam interruption event to a system gateway 203 which transmits a communication to a system server 204. The sensor device 202 may communicate directly with the system gateway 203 (e.g., Near Field Communication (NFC), Bluetooth™, etc.), and/or the sensor device 202 may communicate with the system gateway 203 over a network 206 (e.g., the Internet).

The system gateway 203 may be located in a building where the sensor device 202 is installed, such as in the building on which the sensor device 202 is installed to monitor snowfall accumulation. The system gateway 203 receives the measurement data from the sensor device 202 and transmits the measurement data to a system server 204 via the network 206. The gateway 203 may be installed near a window, for improved communication, in the building holding the sensor device 202. The gateway 203 is connected to the network 206 (e.g., via Ethernet and/or GPRS (General Packet Radio Service)) and a power source is connected. The gateway 203 may include an antenna that is directed upward towards the roof sensor device 202.

The system server 204 is a central portal and may include a database for storing data, such as roof data. For example, the system server 204 may store statistical data and maintenance records about the roof. The statistical data and maintenance records may be provided from contractors and trades service companies that have performed installation or maintenance services on the roof. The system server 204 may be maintained by the service provider for sensor device 202 customers. The system server 204 may be accessed in locations provided with network 206 connections to check property status and history records.

The system server 204 sends roof data, alerts, and warnings to a user communication device 208. The user communication device 208 is for example, a mobile device, a mobile phone, a tablet, a smart phone, a laptop, a purpose built computer, a general purpose computer, or the like. The user communication device 208 has communication capabilities to receive and send monitoring data. The user communication device 208 also has data display capabilities to display information to a user 210. In certain embodiments, there may be a plurality of user communication devices 208 for a plurality of users 210.

The users 210 may be, for example, a property manager user 210a, a snow remover and/or trades user 210b, a consultant, or an insurance company user 210c. The users 210 are grouped with categories and are provided with different services.

The property manager user 210a is able to add, remove, view, and update property information. The property manager user 210a can login and logout of the system to check the sensor status online. The property manager user 210a can register contacts for property for notifications. The property manager user 210a can authorize roofer users 210b for access and register snow remover users 210b for service. The property manager user 210a can inform trades and maintenance providers of information and timelines. The property manager user 210a can verify warranty alarms. The warranty alarm may automatically provide a notice to the property manager user 210a that the warranty period for the roof is about to expire so that the property manager user 210a can initiate an inspection of the roof prior to expiry of the warranty period.

The snow remover and/or trades user 210b can monitor a customer's roofs, receive notifications if service is needed and find potential business.

The insurance company user 210c can track the historic data of a client's roof such as statistical data for geographic area roofing information. The insurance company user 210c may be able to reduce the risk for damages to the building from roofing flood, collapse, and fire.

The system server 204 also receives information from third party databases 212. The third party databases 212 provide information related to weather and satellite data. The third party data may include history maintenance records, weather alarms, and property construction details, for example.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The monitoring device 202, the system gateway 203, the system server 204, and user communication devices 208 may be a server computer, desktop computer, notebook computer, tablet, PDA, smartphone, or another computing device. The devices 202, 203, 204, 208 may include a connection with the network 206 such as a wired or wireless connection to the Internet. In some cases, the network 206 may include other types of computer or telecommunication networks. The devices 202, 203, 204, 208 may each include one or more of a memory, a secondary storage device, a processor, an input device, a display device, and an output device. Memory may include random access memory (RAM), hard drive memory, flash memory, or similar types of memory. Also, memory may store one or more applications for execution by processor. Applications may correspond with software modules comprising computer executable instructions to perform processing for the functions described. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 206. Input device may include any device for entering information into devices 202, 203, 204, 208. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers or screens, for example. In some cases, devices 202, 203, 204, 208 may include multiple of any one or more of processors, applications, software modules, second storage devices, network connections, input devices, output devices, and display devices.

Although devices 202, 203, 204, 208 are described with various components, one skilled in the art will appreciate that the devices 202, 203, 204, 208 may in some cases contain fewer, additional or different components. In addition, although aspects of an implementation of the devices 202, 203, 204, 208 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 202, 203, 204, 208 and/or processor to perform a particular method.

The devices such as the sensor device 202, the system gateway 203, the system server 204, and the user communication devices 208 are described performing certain acts. It will be appreciated that any one or more of these devices 202, 203, 204, 208 may perform an act automatically or in response to an interaction by a user of that device. That is, the user of the device may manipulate one or more input devices (e.g. a touchscreen, a mouse, or a button) causing the device to perform the described act. In many cases, this aspect may not be described, but it will be understood.

The sensor device 202 includes a database 220 for storing measurement data received from the detector 214 (such as a laser beam interruption event). The sensor device 202 includes a processor 224 for processing the measurement data. The sensor device 202 includes a transceiver 222 for sending and receiving data messages from any one or more of the user communication devices 208, the system server 204, and the third party databases 212 such as via the system gateway 203.

The sensor device 202 includes a power supply 226 for providing power to the transceiver 222, database 220, and processor 224. The power supply 226 may be a hard wired connection to the building or other environmental source and/or it may be a battery power supply or solar panel. The power supply 226 may be designed to provide power to the roof sensor device 202 for a long period of time (e.g., years) as it may be undesirable or inconvenient for a user to replace power sources often.

The power supply 226 may have a standby mode, where, in summer months, when it is unlikely that snow is present on a monitored roof, sensor device 202 will turn off or switch to regularly-spaced or event-triggered periodic sensing sessions.

The sensor device 202 may also receive third party weather data from the third party databases 212, to confirm snowfall events for example, and the sensor device 202 may then activate or otherwise respond, such as to more frequently or continuously run a sensing session.

The power supply 226 and other roof sensor device 202 components may be resistant to extreme heat (e.g., 60 degrees Celsius) generated on the roof as well as extreme cold (e.g., −40 degrees Celsius) through winter months. The communication system (e.g. communication system 76 of FIG. 8), may also include reflective surface to reflect light and radiant heat energy to reduce the heat of the sensor device 202, including the power source.

In certain embodiments, the database 220, the transceiver 222, the processor 224, the power supply 226, and other circuitry of the sensor device 202 may be in a communication box, such as the communication box and cover 78, 80 described with reference to FIG. 8.

Figure 16:
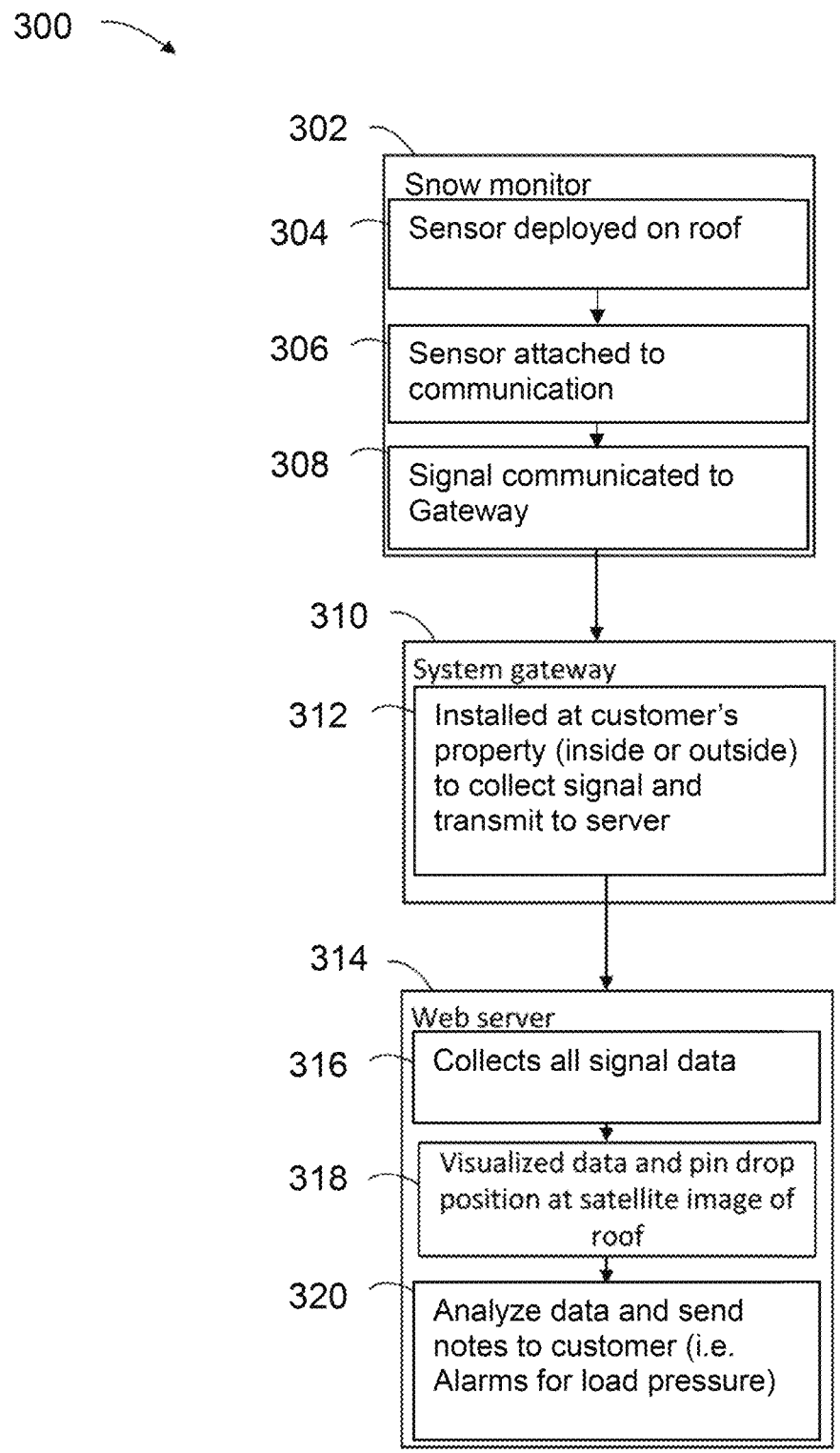
FIG. 16 is a flow chart of a method of monitoring, according to an embodiment.

Referring now to FIG. 16, illustrated therein is a method for roof monitoring 300, in accordance with an embodiment. At 302, the roof monitor (e.g., system 10 or sensor 202) is positioned on a roof at 304, the sensor is coupled to a communication system at 306 and at 308 the sensor generates a signal and the communication system communicates the signal to a system gateway.

At 310 the system gateway is installed at a customer's property at 312 to collect signals from the communications system and transmit the signals to the server. At 314 a web server collects signal data from the system gateway at 316. The web server creates a visualization at 318 (such as a satellite map of the monitored area showing a pin in an area where an issue has been detected). At 320 the web server transmits an alert to a user device (e.g. a message that a snow level has reached a threshold level, along with the satellite map showing where the threshold level has been reached).

Figure 17:
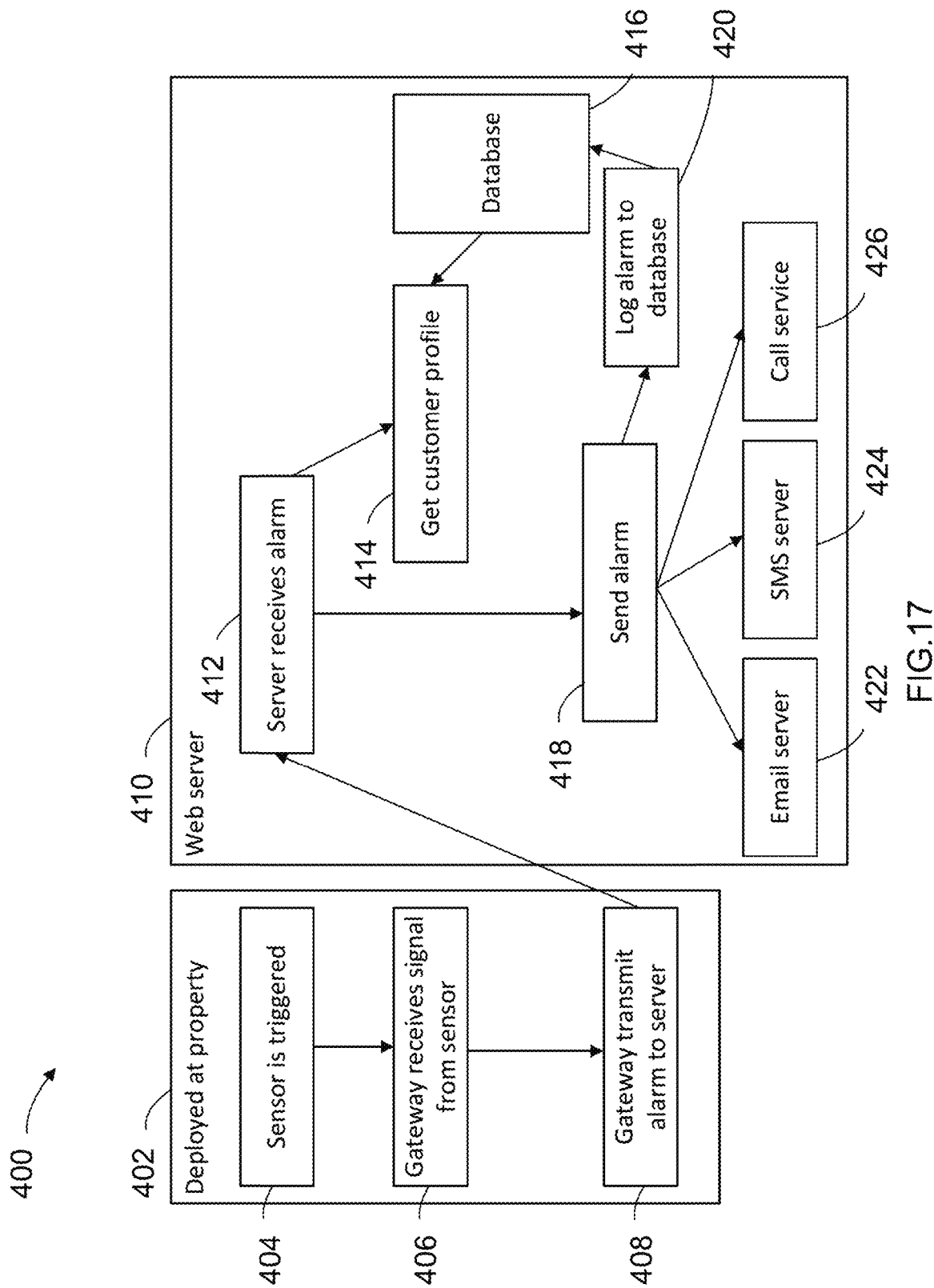
FIG. 17 is a method of sending an alarm, according to an embodiment.

FIG. 17 illustrates a method 400 of a data collecting state of a sensor, in accordance with an embodiment. Sensor system 402 may be deployed at a property, such as on a roof. At 404 the sensor is triggered, such as by detecting a five second break in a laser beam or a five second coincident break in a set of subbeams. The sensor communications system then sends a signal to a gateway, which receives the signal at 406. At 408 the gateway transmits an alarm to a server.

At 410 the web server processes the alarm. The alarm is received by the web server, at 412. The web server retrieves the customer profile, at 414, from a database 416. The customer profile includes alarm details on who should be notified, and how the user should be notified.

At 418, the web server sends the alarm to the user. The web server logs the alarm in the database at 420. Depending on the type of alarm, the web server emails the alarm at 422, SMS the alarm at 424, or calls in the alarm at 426.

Figure 18:
FIG. 18 is a screenshot of a visualization of roof data, according to an embodiment.
Figure 19:
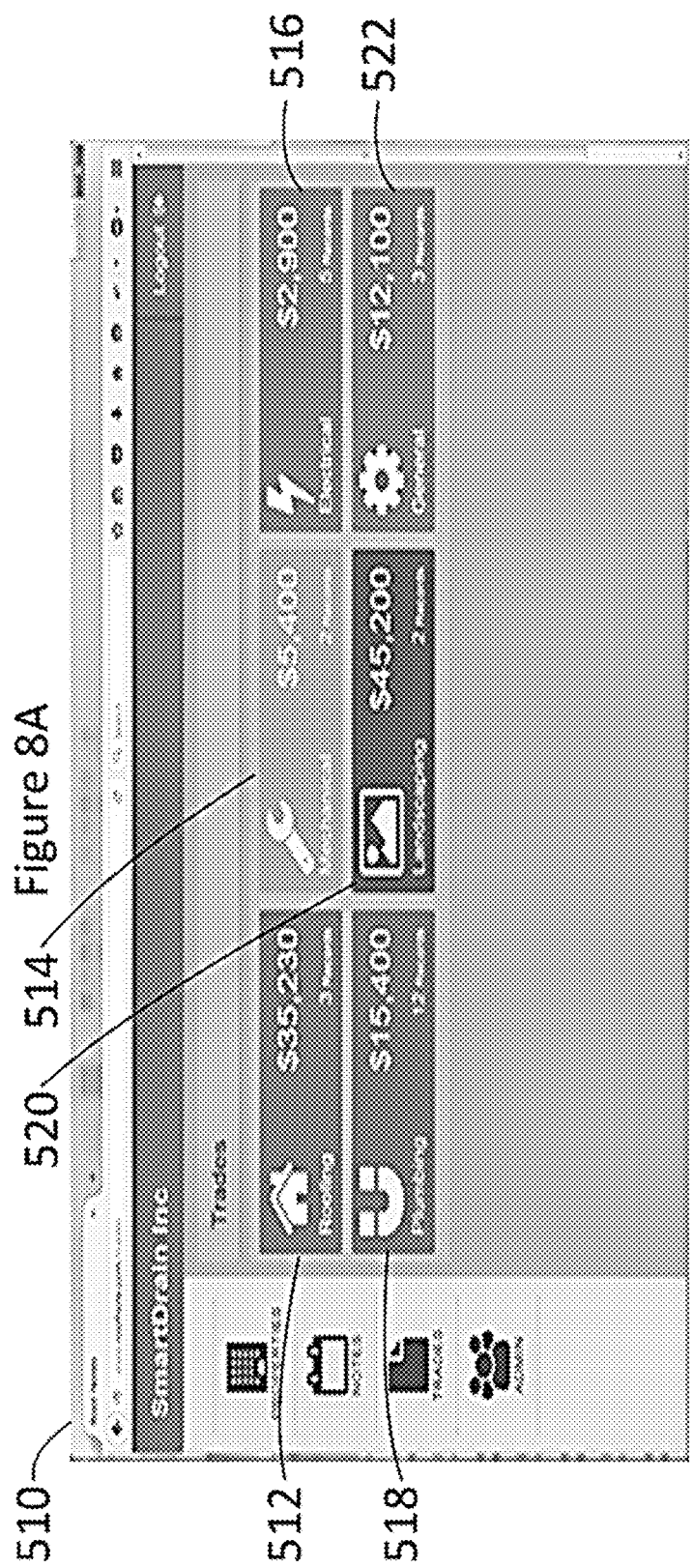
FIG. 19 is a screenshot of a visualization of roof data, according to an embodiment.
Figure 20:
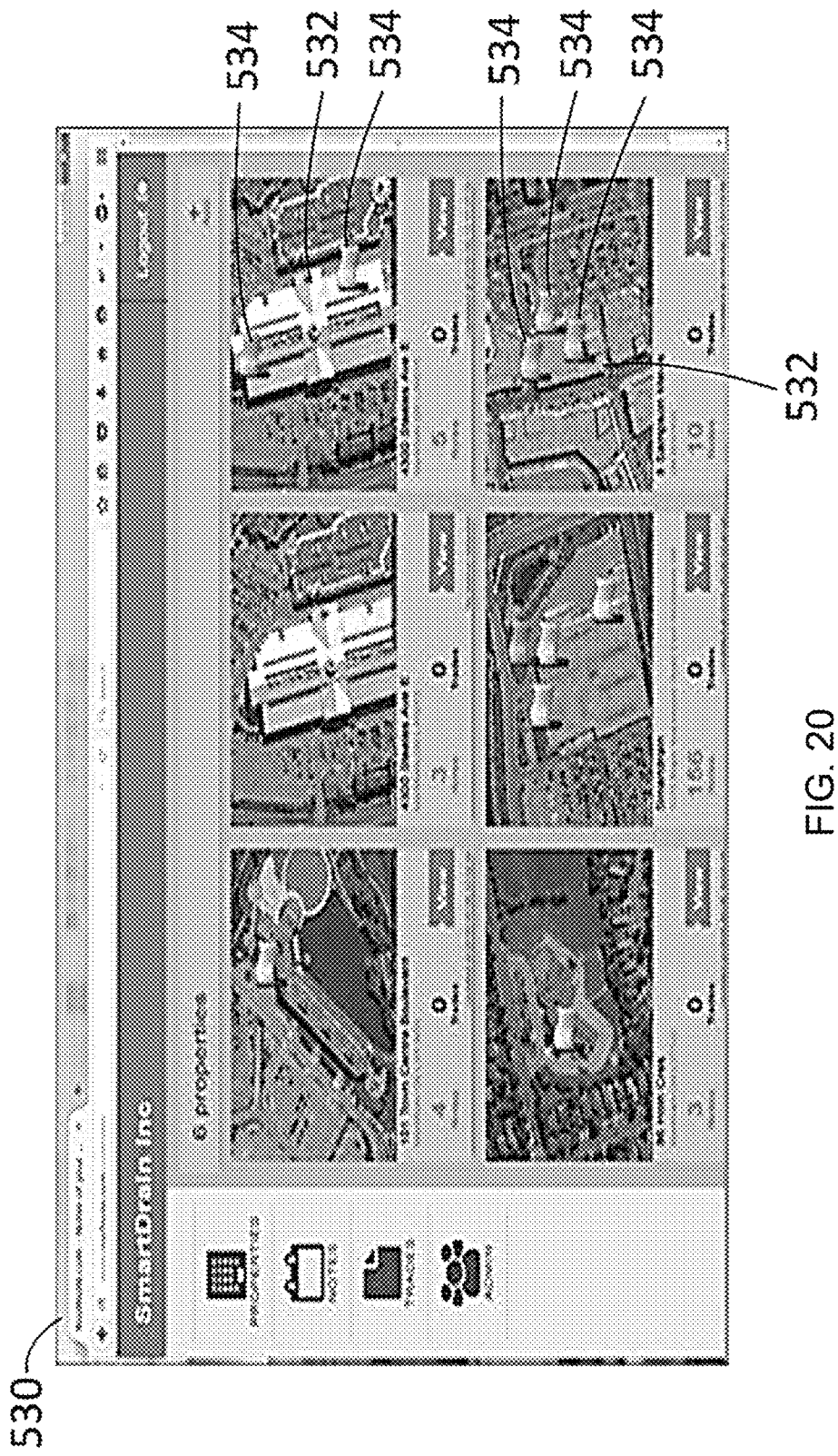
FIG. 20 is a screenshot of a visualization of roof data, according to an embodiment.

FIGS. 18 to 20 are screenshots of a monitoring application, in accordance with an embodiment. In particular, FIG. 18 illustrates roof notes 500. The roof notes 500 describes roof information such as alarms that have been triggered, the installation of the monitoring system, and the historic maintenance of the roof and monitoring system.

FIG. 19 illustrates a trades page 510 for the monitoring system. The trades page 510 includes information about what installation and maintenance has been performed on the roof, including roof costs 512, mechanical repairs 514, electrical investment 516, plumbing work 518, landscaping performed 520 adjacent the roof, and general work 522 on the associated building. The trades page 510 may help with the overall management of the property and provide an comprehensive dashboard to complement the monitoring system.

For example, a monitoring system such as system 10 may be set up to monitor roof activity near an edge of the roof. System 10 may incorporate a camera or may be communicatively coupled to a camera and photos may be taken by the camera in response to a laser beam interruption event. When system 10 triggers a photo capture, a user may consult trades page 510 to determine what was taking place at the time.

FIG. 20 illustrates a location page 530 showing the location of the monitoring system or systems. The location page illustrates the properties 532 that are under control of the user. The location page illustrates satellite images of the building with the monitoring systems. The monitoring systems are marked in the specific location on the satellite images of the buildings that they are installed, for example, using flags 534.

The flags 534 (e.g. a red flag) may alert the property manager to the particular monitoring system that is experiencing an alarm. The property manager can then dispatch a team to deal with the alarm condition. Each building or property 532 may have multiple flags 534. The flags 524 may change in appearance (such as color) depending on any alarm condition, (e.g., detected snow height, battery dead, signal loss, normal). The flags 524 may appear in a certain color (e.g., green) where there are no alarms on the monitoring system and the monitoring system is operating normally.

Figure 21:
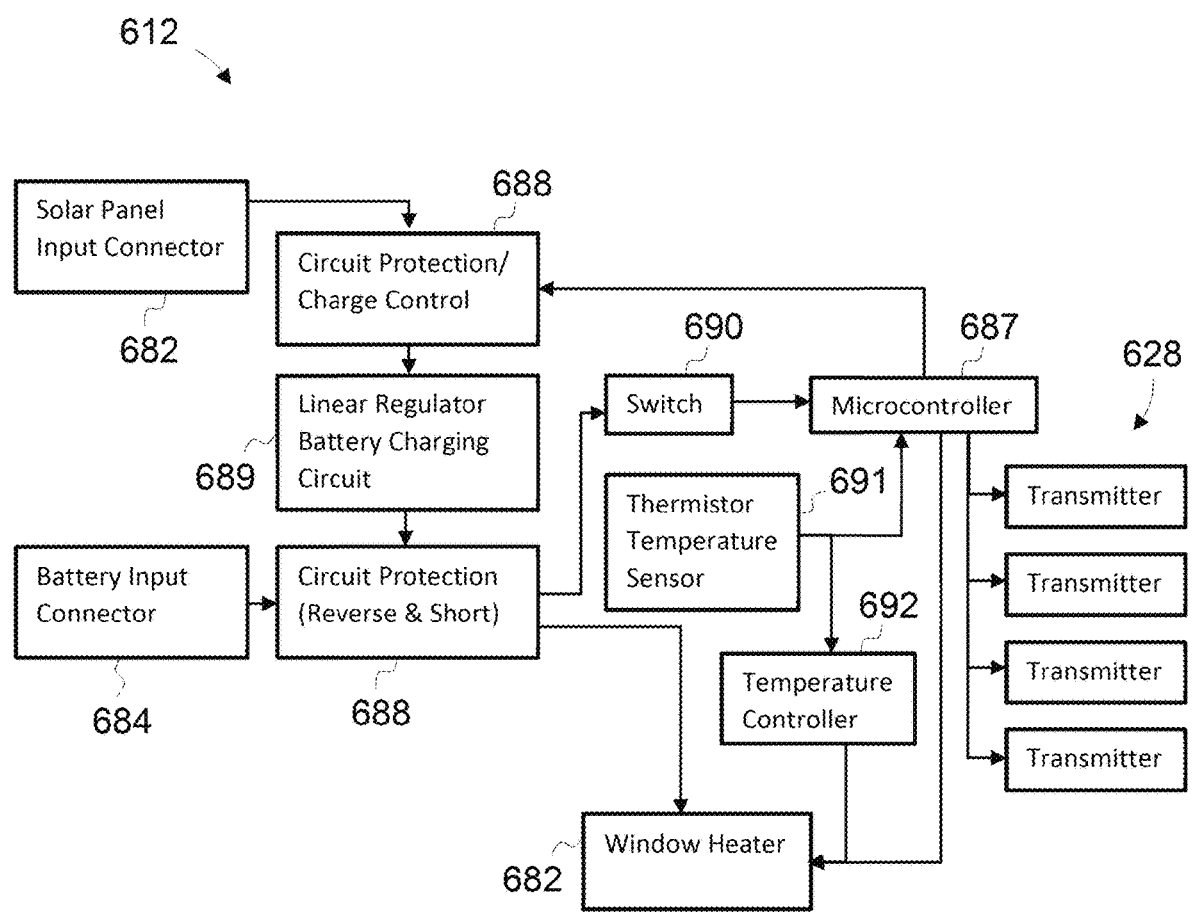
FIG. 21 is a block diagram of a transmitter, according to an embodiment.

Referring to FIG. 21, depicted is another embodiment of a transmitter 612. Transmitter 612 is similar in many respects to transmitter 12, and like features are identified by like reference characters, incremented by 600.

Transmitter 612 includes a microcontroller 687 communicatively coupled to four infrared transmitters 628 to control an operational status of the transmitters 628, such as to control whether the transmitters 628 are on and/or to control a power level or signal output strength or profile of the transmitters 628.

Microcontroller 687 is powered by a power source such as a solar panel or battery. In the illustrated example, microcontroller 687 is coupled to a battery (not shown), such as a 12 volt battery, to be powered by the battery. The battery is coupled to microcontroller 687 through a circuit protection module 688 to protect from reverse and short circuits. Infrared transmitters 628 are also coupled to the battery to be powered by the battery.

The battery is coupled to a solar panel through a linear regulator battery charging circuit 689 to allow the solar panel to recharge the battery. The connection between solar panel and battery is also protected by one or more circuit protection module 688.

In some embodiments, the microcontroller 687 is communicatively coupled to one or more circuit protection module 688 to control the circuit protection module 688. For example, the microcontroller 687 may disable a charge from a solar panel if the temperature is greater than 65 degrees Celsius, such as to protect the solar panel from damage when operating at higher temperatures.

A switch 690 regulates the on/off status of the transmitter 612 by controlling whether the microcontroller 687 receives an operational amount of power from the battery. In some embodiments, switch 690 cuts off a power supply to microcontroller 687 while in some embodiments switch 690 simply switches microcontroller 687 to a standby mode using a less amount of power than in an operational mode. For example, a standby mode may allow a communications system to operate while transmitters 628 are turned off, such as so that transmitter 612 can be returned to an operational mode in which transmitters 628 are operating when the communications system receives a wireless signal from a user device.

Transmitter 612 also includes a window heating subsystem. The window heating subsystem includes a window heater 682 to heat a transmission window of one or more of transmitters 628. For example, when an ambient temperature is below zero a window heater may heat a transmission window to melt any accumulated ice. A melting operation may occur periodically or in response to predetermined criteria, such as a signal from a receiver that the transmitted signal strength has dropped, a detected ambient temperature below one degree above freezing, or a signal from a server that a weather report indicates a precipitation event coincident with a freezing temperature. In the illustrated embodiment, a temperature sensor 691 is configured to sense an ambient temperature and to direct temperature controller 692 to turn on a window heater 682 when the ambient temperature falls below a predetermined level, such as a freezing point. Heater 682 is coupled to the battery to be powered by the battery.

Figure 22:
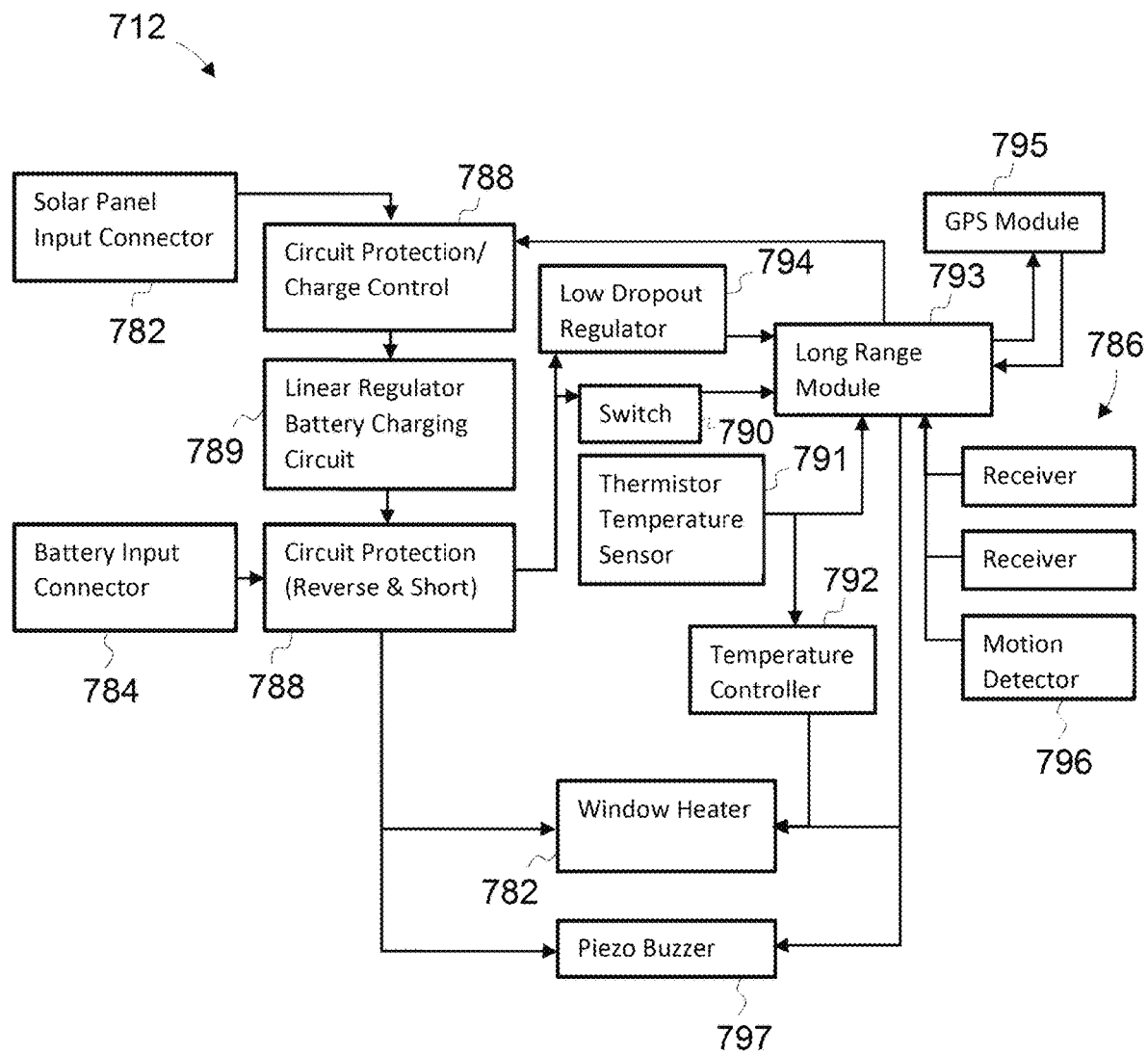
FIG. 22 is a block diagram of a receiver, according to an embodiment.

Referring to FIG. 22, depicted is another embodiment of a receiver 712. Receiver 712 is similar in many respects to receiver 112, and like features are identified by like reference characters, incremented by 600. Receiver 712 is also similar in many respects to transmitter 612, and like features are identified by like reference characters, incremented by 100.

Receiver 712 includes a long range communications module 793, which may be part of a communications system (not shown). The long range communications module is communicatively coupled to the receivers 786 to receive a signal from the receivers 786, such as a signal indicating a break in a received laser beam. The long range communications module 793 may be configured to send a signal to a signal gateway continuously and/or if predetermined conditions are met.

In some embodiments, the long range communications module 793 is also communicatively coupled to a motion detector 792 to receive a signal indicating a detected motion. For example, if a laser interruption is detected, such as a laser interruption lasting at least one second or at least five seconds, but a motion is also detected by the motion detector, the long range communications module 793 may be configured to disregard the laser break. The long range communications system 793 may also or alternatively send both the signal indicating the laser break and the signal indicating the motion to the signal gateway to be deciphered by the signal gateway and/or a server. In some embodiments, a motion detector is set to a sensitivity level that is not triggered by small moving objects such as snowflakes, but is triggered by larger moving objects such as birds or raccoons.

Long range module 793 and receivers 786 and the optional motion detector 796 are coupled to a battery (not shown) through a power circuit to receive power from the battery. The battery is coupled through a circuit protection module 788 and a switch 790. In some embodiments, a power circuit also includes an optional low dropout regulator 794 configured to increase the operational range of the power circuit.

An optional global positioning system (GPS) module 795 is also shown. The GPS module 795 is coupled to the long range communications module 793 to provide positioning information to a server along with information from receivers 786. GPS module 795 is also coupled to the battery to be powered by the battery.

An optional temperature control system may be configured to keep one or more windows of a receiver 786 clear of ice, including a temperature sensor 791, a temperature controller 792, and a window heater 782.

In some embodiments, receiver 712 includes an optional piezo buzzer 797, signal light, or other system configured to generate a signal to be heard or seen by a user adjacent a receiver 712. Such a system may be used to indicate to the adjacent user that a laser interruption event has been detected. For example, a buzzer 797 may communicative coupled to a long range module 793 to receive an indication that a laser interruption event has occurred, and is configured to broadcast an audible signal when a laser interruption event has occurred as an alert any users within a hearing distance.

While the above description provides examples of one or more apparatus, methods, or systems, it will be appreciated that other apparatus, methods, or systems may be within the scope of the claims as interpreted by one of skill in the art.

The invention claimed is:

1. A method of monitoring snowfall accumulation on a roof, comprising:
   a) mounting a transmitter of a monitoring system on the roof, the transmitter including:
      i) a transmitter post having a base end for attaching to the roof and a distal end spaced from the base end by a transmitter post length,
      ii) a laser transmitter assembly selectively securable to the transmitter post between a transmitter proximate position adjacent the base end and a transmitter distal position adjacent the distal end, the laser transmitter assembly including a laser source to generate a laser beam and a plurality of laser transmitters positioned to receive the laser beam from the laser source and split the laser beam into a plurality of spatially discrete laser subbeams and project the plurality of spatially discrete laser subbeams from the transmitter; and
   b) mounting a receiver of the monitoring system on the roof, the receiver separated from the transmitter across the roof by a transmission distance, the receiver including:
      i) a receiver post having a base end for attaching to the roof and a distal end spaced from the base end by a receiver post length,
      ii) a laser receiver assembly selectively securable to the receiver post between a receiver proximate position adjacent the base end and a receiver distal position adjacent the distal end to be aligned with the laser transmitter assembly to receive the plurality of laser subbeams, the laser receiver assembly including a detector to detect the plurality of laser subbeams and generate a signal in response to a laser beam interruption event, wherein the laser beam interruption event is a coincident interruption of each of the plurality of laser subbeams, and
   c) transmitting the plurality of laser subbeams between the laser transmitter assembly and the laser receiver assembly; and
   d) detecting the laser beam interruption event.

2. The method of claim 1, further comprising:
   a) securing the laser transmitter assembly to the transmitter post at a first location;
   b) securing the laser receiver assembly to the receiver post at a second location, and
   c) wherein the first and second locations are selected such that a snow accumulation on the roof of sufficient height and density to require service will interrupt the plurality of laser subbeams.

3. The method of claim 1, wherein the laser beam interruption event is an interruption lasting at least five seconds.

4. The method of claim 1, wherein the plurality of laser subbeams are generally parallel and spaced apart by a transmission spacing of at least 1 mm.

5. The method of claim 4, wherein the plurality of laser subbeams includes a first beam and a second beam spaced further from the roof than the first beam.

6. The method of claim 4, wherein the transmission spacing is at least 10 mm.

7. The method of claim 4, wherein the laser beam interruption event is an interruption lasting at least five seconds.

8. The method of claim 1, wherein the transmitter includes a first solar panel coupled to the laser transmitter assembly to power the laser source and the receiver includes a second solar panel coupled to the detector to power the detector.

9. The method of claim 1, further comprising receiving the signal at a communication system coupled to the detector; and transmitting the signal to a user communication device using the communication system.

10. The method of claim 9, wherein the communication system includes a communications box and a communications box cover for providing a weather tight compartment for housing a set of electronics of the communication system.

11. The method of claim 10, wherein the set of electronics includes a transceiver.

12. A method of monitoring snowfall accumulation on a roof, comprising:
   a) mounting a transmitter of a monitoring system on the roof, the transmitter including:
      i) a transmitter post having a base end for attaching to the roof and a distal end spaced from the base end by a transmitter post length,
      ii) a laser transmitter assembly selectively securable to the transmitter post between a transmitter proximate position adjacent the base end and a transmitter distal position adjacent the distal end, the laser transmitter assembly including a laser source arranged to project a laser beam from the transmitter; and
   b) mounting a receiver of the monitoring system on the roof, the receiver separated from the transmitter across the roof by a transmission distance, the receiver including:
      i) a receiver post having a base end for attaching to the roof and a distal end spaced from the base end by a receiver post length,
      ii) a laser receiver assembly selectively securable to the receiver post between a receiver proximate position adjacent the base end and a receiver distal position adjacent the distal end to be aligned with the laser transmitter assembly to receive the laser beam, the laser receiver assembly including a detector to detect the laser beam and generate a signal in response to a laser beam interruption event, and
   c) receiving, at a communications system, weather data indicating an expected snowfall event, the communications system coupled to the transmitter; and
   d) turning on in response to the communications system receiving the weather data indicating the expected snowfall event.

13. The method of claim 12, further comprising receiving at the communications system weather data indicating that no snowfall is expected; and turning off the transmitter in response to the communications system receiving the weather data indicating that no snowfall is expected.

14. The method of claim 9, wherein the communication system includes a system gateway and a system server, the system gateway configured to receive the signal and transmit the signal to the system server.

15. The method of claim 14, wherein the system server is configured to receive the signal and send a snow accumulation warning to the user communication device.

16. The method of claim 15, wherein the snow accumulation warning includes a satellite map showing a location for which the warning is provided.

17. A method of monitoring snowfall accumulation on a roof, comprising:
   a) mounting a transmitter of a monitoring system on the roof, the transmitter including:
      i) a transmitter post having a base end for attaching to the roof and a distal end spaced from the base end by a transmitter post length,
      ii) a laser transmitter assembly selectively securable to the transmitter post between a transmitter proximate position adjacent the base end and a transmitter distal position adjacent the distal end, the laser transmitter assembly including a laser source arranged to project a laser beam from the transmitter; and
   b) mounting a receiver of the monitoring system on the roof, the receiver separated from the transmitter across the roof by a transmission distance, the receiver including:
      i) a receiver post having a base end for attaching to the roof and a distal end spaced from the base end by a receiver post length,
      ii) a laser receiver assembly selectively securable to the receiver post between a receiver proximate position adjacent the base end and a receiver distal position adjacent the distal end to be aligned with the laser transmitter assembly to receive the laser beam, the laser receiver assembly including a detector to detect the laser beam and generate a signal in response to a laser beam interruption event, and
   c) detecting a snowfall event by way of a sensor; and
   d) in response to detecting the snowfall event by way of the sensor, turning on the laser source to monitor snow accumulation.

18. The method of claim 1, further comprising heating a transmission window of the transmitter to reduce ice build up.

19. The method of claim 18, further comprising receiving a melting criteria prior to heating the transmission window, the melting criteria including a signal indicating that a strength of the plurality of laser subbeams has dropped, a signal indicating that a detected ambient temperature is below a threshold temperature, or a signal indicative of a precipitation event coincident with freezing temperatures.

20. The method of claim 1, further comprising detecting a motion via a motion detector; and, in response to detecting a motion coincident with the laser beam interruption event, disregarding the laser beam interruption event.

* * * * *